United States Patent [19]

Motley et al.

[11] 3,988,539

[45] Oct. 26, 1976

[54] DATA TRANSMISSION SYSTEM USING OPTIMAL EIGHT-VECTOR SIGNALING SCHEME

[75] Inventors: David M. Motley, Santa Ana; King Y. Cheng, Tustin, both of Calif.

[73] Assignee: Hycom Incorporated, Irvine, Calif.

[22] Filed: Sept. 16, 1974

[21] Appl. No.: 506,208

[52] U.S. Cl. .................................. 178/67; 325/30
[51] Int. Cl.² ........................................ H04L 27/18
[58] Field of Search ............. 325/30, 38 A, 42, 60, 325/61, 65; 332/17; 178/66 R, 67, 68; 340/347 DD

[56] References Cited
UNITED STATES PATENTS

| | | | |
|---|---|---|---|
| 3,597,688 | 8/1971 | Ogi | 178/67 |
| 3,619,501 | 11/1971 | Nussbaumer | 178/67 |
| 3,706,945 | 12/1972 | Yanagidaira et al. | 178/66 R |
| 3,727,134 | 4/1973 | Melvin | 325/30 |
| 3,845,412 | 10/1974 | Rearwin et al. | 178/66 |
| 3,849,595 | 11/1974 | Ishiguro | 325/30 |
| 3,887,768 | 6/1975 | Forney, Jr. et al. | 178/67 |
| 3,955,141 | 5/1976 | Lyon et al. | 325/60 |

OTHER PUBLICATIONS

IEEE Transactions on Communications, vol. CO-M-22, No. 1, Jan. 1974, pp. 28–38, "Optimization of Two Dimensional Signal Constellations in the Presence of Gaussian Noise," Foschini, Gitlin and Weinstein.

Primary Examiner—Benedict V. Safourek
Attorney, Agent, or Firm—Gordon L. Peterson

[57] ABSTRACT

In a system for transmitting information between first and second data processing apparatuses, a signaling scheme provides a digital data signal with in-phase components and quadrature components which define a plurality of vectors. The vectors, when plotted on a graph having an abscissa and an ordinate, each have a minimum separation distance defined by the radius of a circle having its center at the tip of the associated vector. The circles of the vectors, which are aligned in rows substantially parallel to the abscissa or the ordinate of the graph, are tangential to the adjacent circles. Boundary areas associated with the respective vectors are defined by boundary lines extensions of which pass through points defined by the vector components. This signaling scheme minimizes vector magnitude, associated with minimum power, while maximizing vector separation distance, associated with reduced detection error.

26 Claims, 12 Drawing Figures

| $c_i$ | $b_i$ |
|-------|-------|
| 000 | 000 |
| 001 | 001 |
| 010 | 011 |
| 011 | 010 |
| 100 | 110 |
| 101 | 111 |
| 110 | 101 |
| 111 | 100 |

| $d_i$ | $DI_j$ | $DQ_j$ |
|-------|--------|--------|
| 000 | 0 | 1.732 |
| 001 | 2 | 1.732 |
| 010 | 1 | 0 |
| 011 | 2 | -1.732 |
| 100 | 0 | -1.732 |
| 101 | -2 | -1.732 |
| 110 | -1 | 0 |
| 111 | -2 | 1.732 |

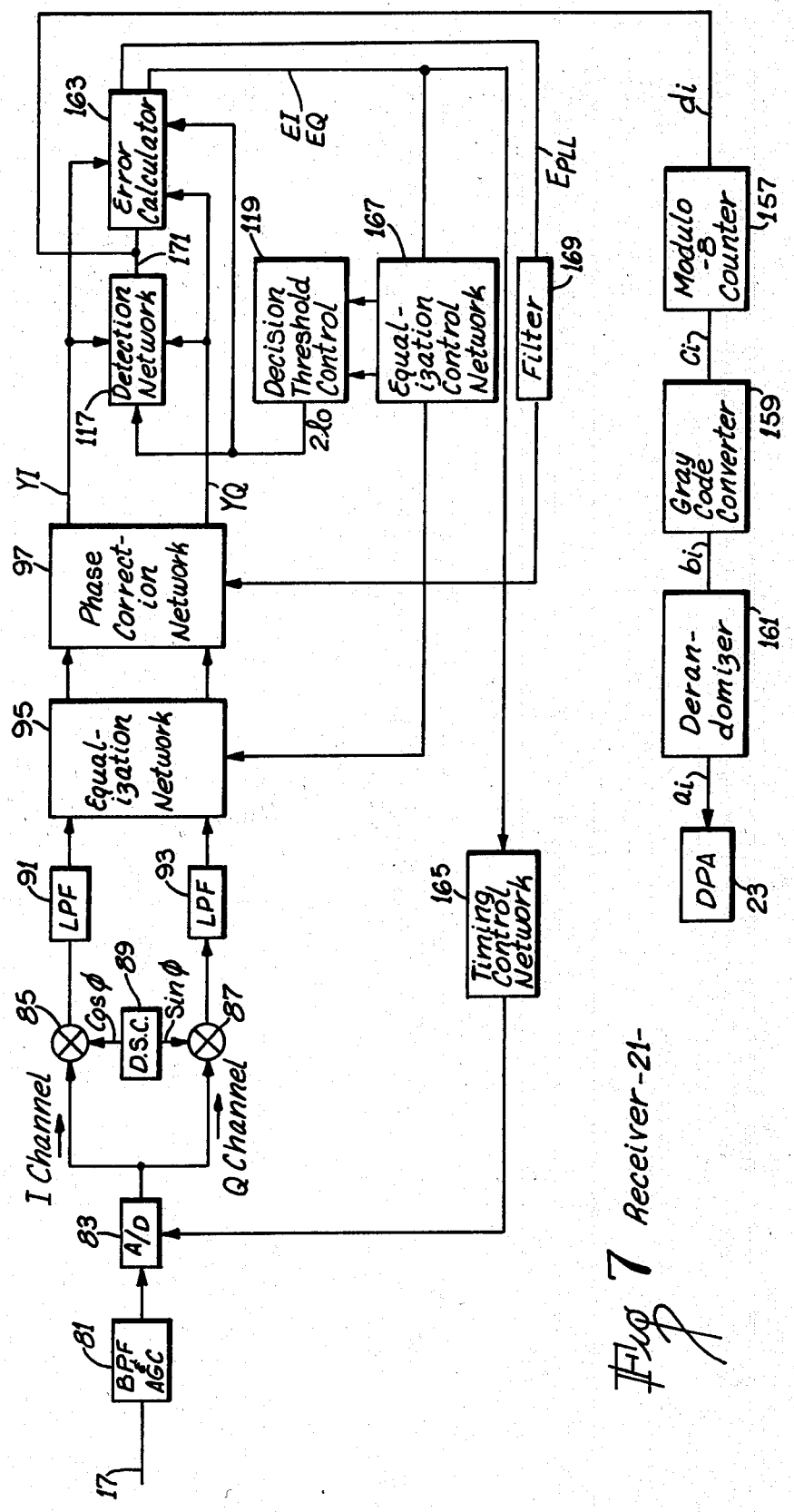
Fig 7 Receiver-21-

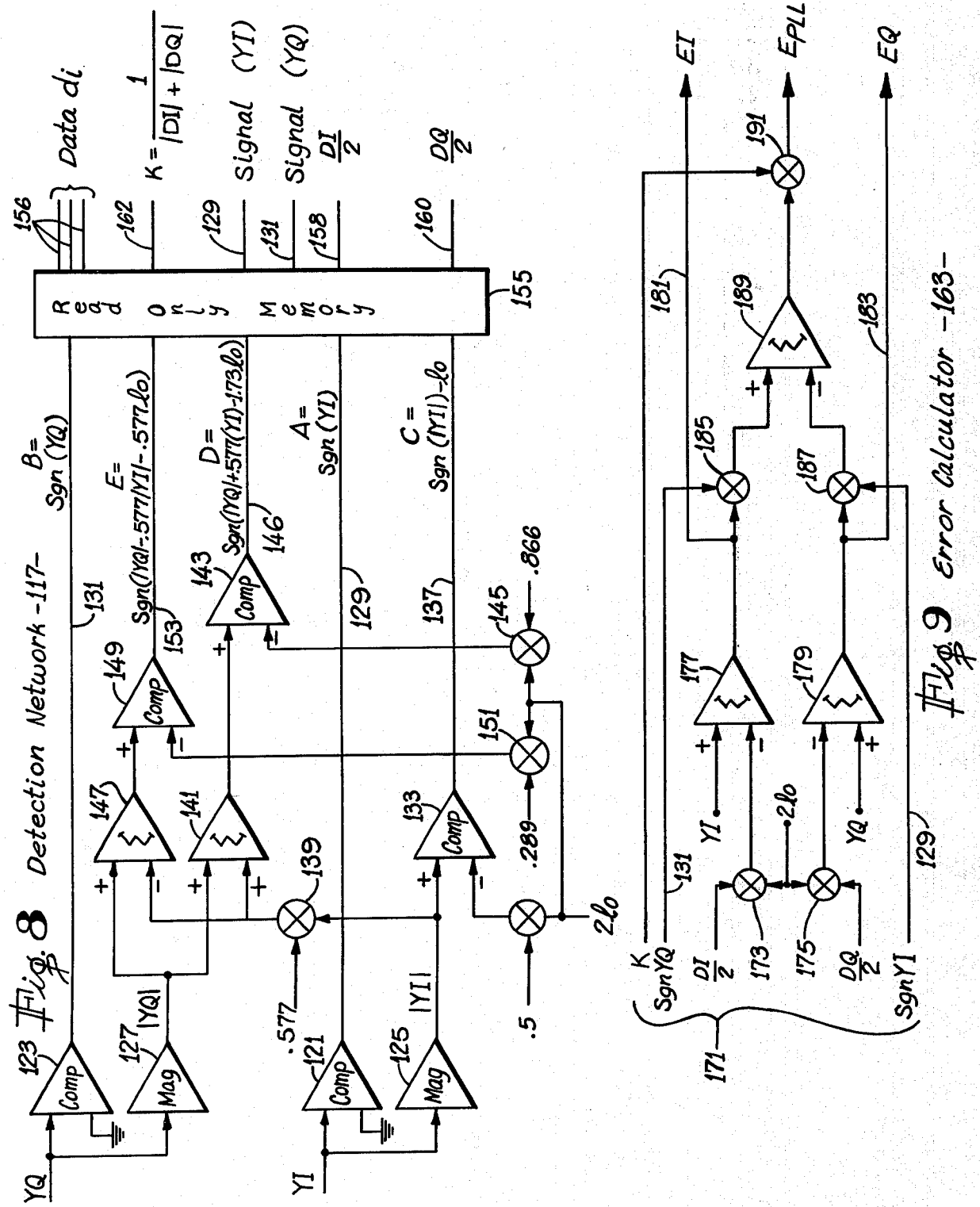

Fig. 8A

Detection Table

| Detection Signals | | | | | Detection Sig. Vector | Data $d_i$ | $\frac{DI}{2}$ | $\frac{DQ}{2}$ | $K=\frac{1}{|DI|+|DQ|}$ |
|---|---|---|---|---|---|---|---|---|---|
| A | B | C | D | E | | | | | |
| X | 1 | 0 | X | 1 | 0 | 000 | 0 | .866 | .577 |
| 1 | 1 | 1 | 1 | X | 1 | 001 | 1.0 | .866 | .268 |
| 1 | X | X | 0 | 0 | 2 | 010 | .5 | 0 | 1.0 |
| 1 | 0 | 1 | 1 | X | 3 | 011 | 1.0 | -.866 | .268 |
| X | 0 | 0 | X | 1 | 4 | 100 | 0 | -.866 | .577 |
| 0 | 0 | 1 | 1 | X | 5 | 101 | -1.0 | -.866 | .268 |
| 0 | X | X | 0 | 0 | 6 | 110 | -.5 | 0 | 1.0 |
| 0 | 1 | 1 | 1 | X | 7 | 111 | -1.0 | .866 | .268 |

DATA TRANSMISSION SYSTEM USING OPTIMAL EIGHT-VECTOR SIGNALING SCHEME

BACKGROUND OF THE INVENTION

1. Field of the Invention

This invention relates generally to systems for transmitting digital data over transmission lines and more specifically to apparatus for encoding the data to provide a signal which can be transmitted with minimum power and minimum detection error.

2. Description of the Prior Art

Various signaling schemes have been used in the prior art to encode and otherwise modify data for transmission. For example, in some of the systems of the prior art, the digital data has been randomized, Gray encoded, and differentially encoded to provide data symbols representative of the information in the data. These data symbols have been further modified to provide a digital signal having both in-phase and quadrature components. Each of the in-phase components defines with one of the quadrature components one of a first group of vectors, each of which is representative of the information in one of the data symbols.

The in-phase and quadrature components of the vectors have been separately lowpass filtered and individually modulated in respective in-phase and quadrature channels. These modulated signals have been added to provide a composite signal which has been converted to an analog format and lowpass filtered for transmission on the transmission line.

At a distant location, a receiver has sampled the transmitted signal on the transmission line to provide a digital signal. This digital signal has been demodulated to provide in-phase and quadrature components which have been equalized to correct for delay and attenuation distortion caused by the transmission line. The equalized signal has been phase corrected to provide in-phase and quadrature components which define a second group of vectors similar to the first group of vectors. These vectors have been detected, differentially and Gray decoded, and derandomized prior to being forwarded to a second data processing apparatus at the second location.

The vectors resulting from the modification of the data symbols have a relationship with respect to each other which is particularly critical in order to facilitate detection while minimizing transmission power. These vectors can be plotted on a graph having an ordinate and an abscissa wherein the distance of the vector from the ordinate is dependent upon the in-phase component of the vector and the distance of the vector from the abscissa is dependent upon the quadrature component of the vector. A minimum distance separating the vectors can be illustrated on the graph as the radius of a circle having a center at the point of the vector.

In order to minimize transmission power, it is desirable that the magnitude of the vectors be minimized. On the other hand, in order to facilitate detection, it is desirable that the distance separating the vectors be maximized. This maximum separation distance is generally associated with vectors of greater magnitude. It is further desirable that the magnitudes of the vectors be substantially equal so that the ratio of the peak magnitude with respect to the root-mean-square of the vector magnitudes approaches unity. This is desirable in order to minimize the effects of nonlinear distortion.

In one signaling scheme of the prior art, the vectors, which are equal in magnitude, are disposed at 45° angles around the origin of the graph. Thus, the circles representative of minimum separation distance are arranged in a circle having its center at the origin of the graph.

Although the ratio of peak-to-rms magnitudes of the vectors for this signaling scheme is equal to unity, the length of the vectors is particularly great in order to provide an acceptable separation distance. For example, if the circles representing minimum separation distance are tangential and have a radius of unity, the magnitude of each of the vectors is equal to 2.613. It follows that the average signal power under these conditions is 6.828. Thus, the power needed to transmit the vector components in this signaling scheme has been relatively large in order to minimize detection error.

In a further signaling scheme of the prior art, vectors providing the unity separation distance include a first group of vectors disposed along the ordinate and abscissa of the graph and having a magnitude of three units. A second group of vectors displaced from the ordinate and abscissa at angles of 45° have magnitudes of 1.414 units.

In this signaling scheme, the peak-to-rms rate for a unity separation distance is 1.28 and the average signal power is 5.5. Thus, in comparison to the previously described scheme of the prior art, a lesser magnitude of transmission power is needed to provide the same detection error. Nonetheless, the power requirements even for this signaling scheme have been relatively great.

SUMMARY OF THE INVENTION

The apparatus of the present invention provides a signaling scheme characterized by vectors which optimize the desirable features of minimum vector length, substantially equal vector length, and maximum separation distance. For a unity separation distance, the signaling scheme of the present invention provides a peak-to-rms ratio of 1.25. This is less than the scheme of the prior art providing the best performance. In addition, the average signal power for the present signaling scheme is only 4.5. This provides an increase in performance of 0.87 db over the best scheme of the prior art and an increase of 1.81 db over the other scheme previously discussed. This is particularly significant when it is realized that a 1 db improvement in performance can result in a reduction in symbol error of greater than ten to one.

The vectors of the present signaling scheme include a pair of vectors each disposed along the abscissa of the graph and having a first magnitude. A second pair of vectors, each disposed along the ordinate of the graph, have a second magnitude greater than the first magnitude. A group of four vectors are each defined by an in-phase component equal to twice the first magnitude and a quadrature component equal to the second magnitude. The circles representative of the minimum separation distance of the vectors thus define three rows including respectively, three circles, two circles, and three circles. Each of the circles is tangential to the adjacent circles so that the two circles in the second row are each tangential to five of the other circles.

A plurality of boundary lines, each passing tangentially to the circles at their points of tangency, define boundary areas each associated with one of the vectors. Thus a pair of first boundary lines separate the circles in the first row and a pair of second boundary lines separate the circles in the third row. Both the first and second boundary lines are substantially parallel to the ordinate of the graph. However, a group of third boundary lines extending tangentially to the circles in the second row have an angular relationship to both the ordinate and the abscissa of the graph. Thus, the third boundary lines define with each of the first and third boundary lines a point which is displaced from both the ordinate and the abscissa of the graph. Furthermore, the boundary lines associated with the circles in the second row define boundary areas having a pentagonal shape.

Each of these characteristics of the boundary lines and circles is representative of the vector pattern associated with the present invention. This vector pattern provides for minimum detection error commensurate with minimum transmission power. Thus, performance is improved by a magnitude of approximately 10 over the systems of the prior art. Furthermore, this is accomplished with a reduction in the peak-to-rms ratio of the best performing scheme of the prior art.

The invention includes apparatus for detecting the presence of vectors in the various boundary areas. The system is also provided with an error calculator responsive to the vectors detected to provide a system error signal for updating the sampling, equalization, and detection circuits in the receiver.

These and other features and advantages of the present invention will become more apparent with a description of preferred embodiments and reference to the associated drawings.

DESCRIPTION OF THE DRAWINGS

FIG. 7 is a block diagram of the receiver illustrated in FIG. 1, the receiver including a detection network and error calculator of the present invention;

FIG. 8 is a block diagram of one embodiment of the detection network illustrated in FIG. 7;

FIG. 8A is a table illustrating the characteristics of signals associated with the detection network of FIG. 8; and FIG. 9 is a block diagram of one embodiment of the error calculator illustrated in FIG. 7.

DESCRIPTION OF PREFERRED EMBODIMENTS

Figure 1:
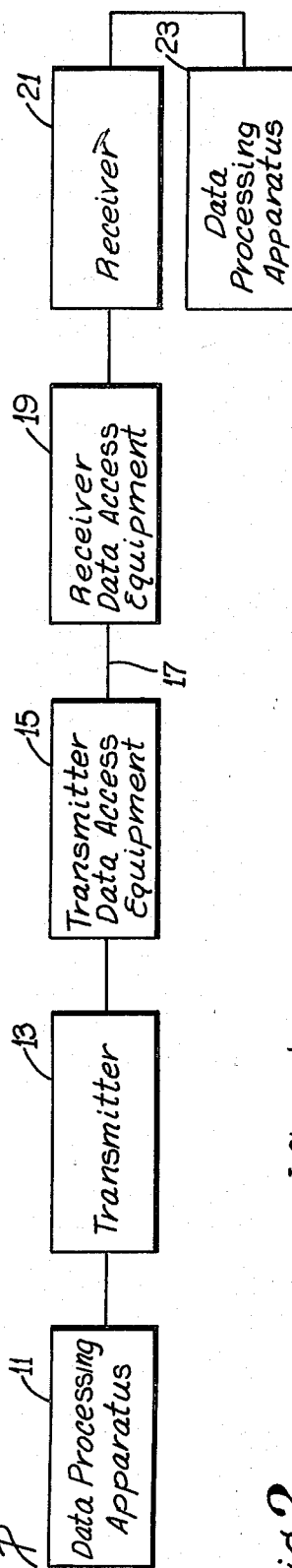
FIG. 1 is a block diagram of a system for transmitting data over a transmission line, the system including a transmitter and a receiver of the present invention.

The present invention concerns digital modems which facilitate the transmission of digital data between a pair of data processing apparatuses communicating with each other over a telephone line. A first such data processing apparatus is shown schematically in FIG. 1 and designated by the reference numeral 11. The data from the first data processing apparatus 11 is encoded in a transmitter 13 which can be a double sideband suppressed quadrature carrier amplitude modulated transmitter. This data is then sent to data access equipment 15 which interfaces with a plurality of transmission lines, such as the telephone line 17.

In a preferred embodiment, the telephone line 17 is terminated at receiver data access equipment 19 and introduced to a receiver 21 which can be a double sideband suppressed quadrature carrier amplitude modulated receiver. In the receiver 21, the incoming signal is demodulated and decoded before it is forwarded to a second data processing apparatus 23. In this manner, the data from the first data processing apparatus 11 can be transmitted to the second data processing apparatus 23 over the telephone line 17.

Figure 2:
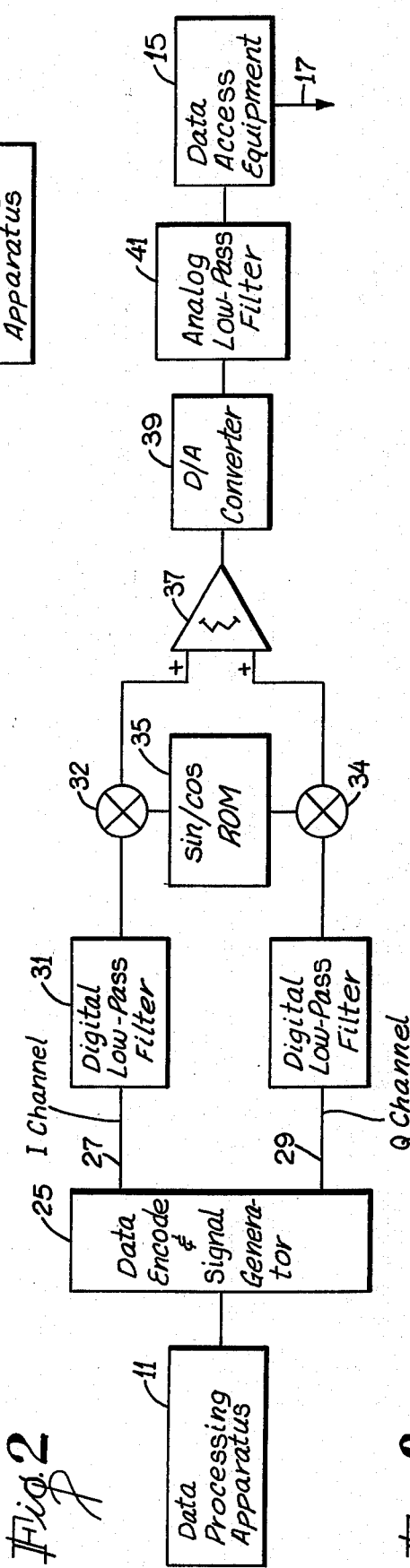
FIG. 2 is a block diagram of the transmitter illustrated in FIG. 1, including a data encoder and signal generator of the present invention.

The transmitter 13 is shown in greater detail in FIG. 2 between the first data processing apparatus 11 and the transmission data access equipment 15. A data encoder and signal generator 25 is connected to the data access equipment 11 and adapted to receive straight binary digitized data therefrom at a particular rate such as 2400 bits per second (bps) or 4800 bps. Within the encoder and signal generator 25, the incoming data is randomized and differentially encoded, and vector component signals are generated for separation into an in-phase channel and a quadrature channel. These channels will hereinafter be referred to as the I channel and Q channel, respectively.

In the I and Q channels the vector component signals can be introduced to a pair of digital lowpass filters 31 and 33 respectively. After being appropriately filtered, the signals in the I and Q channels can then be introduced to multipliers 32 and 34, respectively, wherein they can be multiplied at a carrier frequency, such as 1600 Hertz, by digital quantities from a SIN/COS ROM 35. The products from the multipliers 32 and 34 can be summed in an adder 37, converted to an analog format in a digital-to-analog converter 39, and smoothed by an analog lowpass filter 41. In its analog format, this signal can be introduced to the telephone line 17 through the data access equipment 15.

The transmitter 13 can be similar to that described in a patent application for an Automatic Digital Modem, Ser. No. 324,657, filed on Jan. 18, 1973, and assigned of record to the assignee of record of the present application. As a point of distinction however, it should be noted that the lowpass filters 31 and 33 of the present invention can be tuned with similar lowpass filters in the receiver 21 to provide raised cosine signaling which is well known in the art to provide a more rapid response than the partial response signaling disclosed in the application Ser. No. 324,657.

Figure 3:
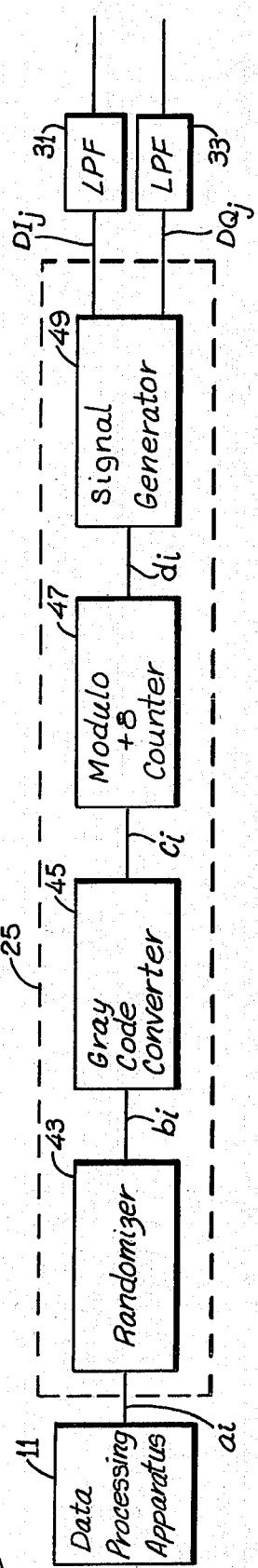
FIG. 3 is a block diagram of the data encoder and signal generator illustrated in FIG. 2, including a Gray code converter and a Modulo +8 counter.

The data encoder and signal generator 25 is illustrated in greater detail in FIG. 3. It can be seen that in a preferred embodiment, the data encoder and signal generator 25 includes a self synchronizing pseudo randomizer 43 which is responsive to a digital data signal $a_i$ from a digital processing apparatus 11 to provide a randomized signal $b_i$. This randomizer 43 can be one of many different types well known in the art. The randomized signal $b_i$ can be introduced to a Gray code converter 45 which minimizes the number of bits in error when a symbol error occurs. A Gray coded signal $c_i$ at the output of the converter 45 can be introduced to a Modulo +8 counter 47 which differentially encodes the data for the purpose of resolving 180° ambiguities in the received data stream. A signal $d_i$ from the counter 47 can then be introduced to a signal generator 49 which provides vector component signals $DI_j$ and $DQ_j$ which are respectively introduced to the lowpass filters 31 and 33. The signal $DI_j$ represents the jth data symbol in the vector component signal of the I channel. Similarly, the signal $DQ_j$ represents the jth data symbol in the vector component signal of the Q channel.

Figures 3A, 3B, 4:
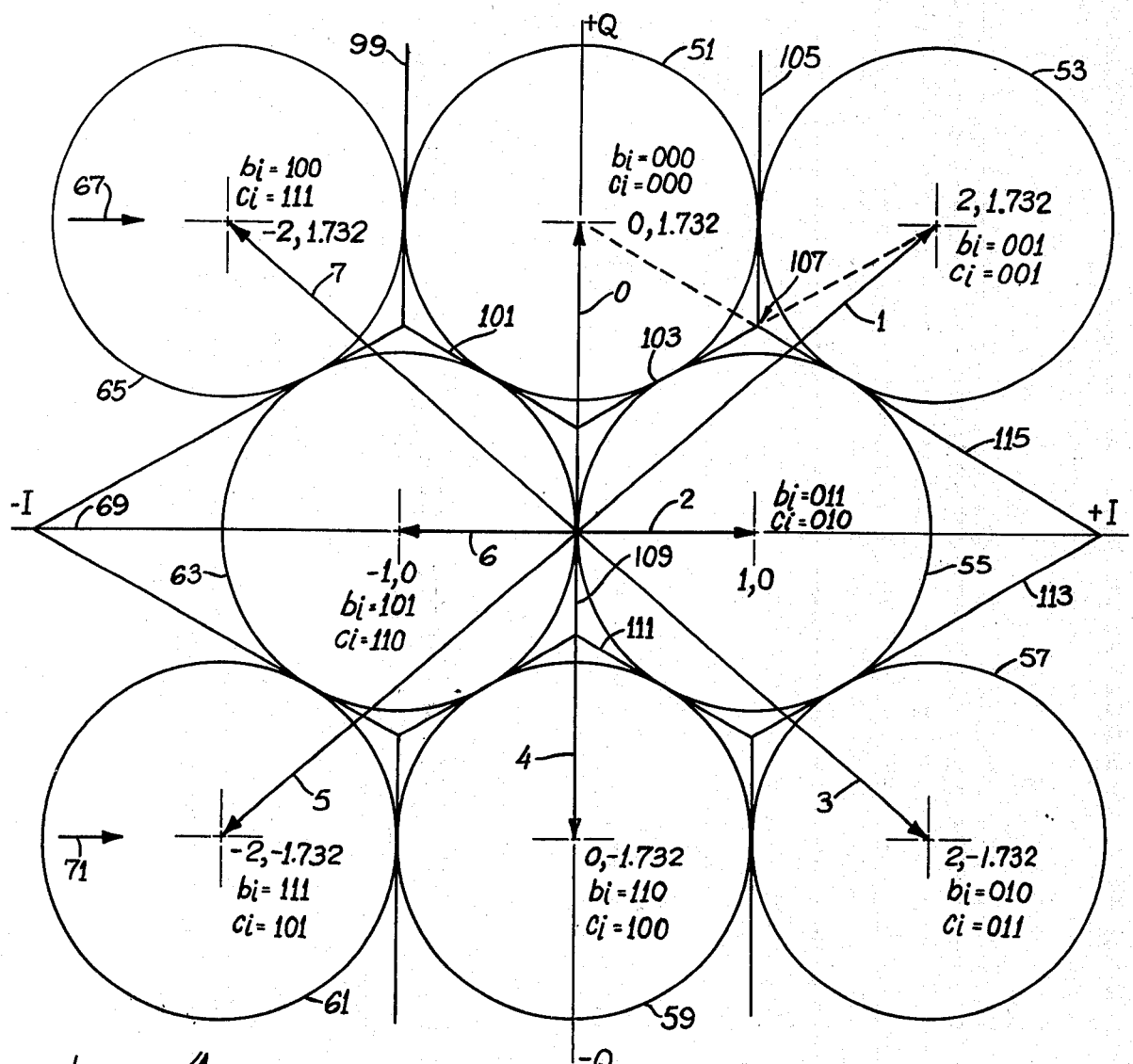
FIG. 3A is a table illustrating the characteristics of signals in a preferred embodiment of the Gray code converter illustrated in FIG. 3.
FIG. 3B is a table illustrating the characteristics of signals in a preferred embodiment of the Modulo +8 counter illustrated in FIG. 3.
FIG. 4 is a graph illustrating signal vectors and detection boundary areas associated with the signaling scheme of the present invention.

The signals $b_i$ and $c_i$ are set forth in a truth table illustrated in FIG. 3A. These signals illustrate the result achieved by the Gray code converter 45, the function of which will be described in greater detail below.

The signals $d_i$, $DI_j$, and $DQ_j$ are set forth in a truth table illustrated in FIG. 3B. These signals illustrate the particular vector components $DI_j$ and $DQ_j$ which are associated with the data $d_i$ received at the input of the signal generator 49. In a particular embodiment, the signal generator 49 can be a read-only-memory responsive to the symbols in the signal $d_i$ to provide the vector components $DI_j$ and $DQ_j$ associated with the respective symbols.

The Modulo +8 counter 47 is a differential encoder of the type well known in the art. The purposes, functions and advantages associated with differential encoding are set forth in Bennett and Davey, *Data Transmission*, (McGraw-Hill Co., 1965). Additional discussion of differential encoders can be found in U.S. Pat. No. 3,701,948, entitled "System for Phase Locking on a Virtual Carrier" which issued to McAuliffe on Oct. 31, 1972. It is basically the purpose of the Modulo +8 counter 47 to resolve ambiguities in the system. These ambiguities will be discussed in greater detail below.

At the output of the signal generator 49 of this particular embodiment, the $DI_j$ and $DQ_j$ component signals define one of eight vectors dependent upon the characteristics of the signal $d_i$. These eight vectors, which are plotted on the graph in FIG. 4, are designated by the reference numerals 0 through 7. These reference numerals also signify the signal states associated with the respective vectors. The graph of FIG. 4 has an abscissa designated with a capital I as the in-phase axis, and an ordinate designated with a captial Q as the quadrature axis. The in-phase axis I and quadrature axis Q intersect at the origin of the graph.

Of particular interest to the present invention is the minimum distance which separates the vectors 0 through 7 from the adjacent vectors on the graph. This minimum separation distance is illustrated in FIG. 4 by a plurality of circles designated with consecutive odd numerals between 51 and 65 which are respectively associated with the vectors 0 through 7. Each of these circles 51 to 65 is assumed to have a radius of unity and a center at the tip of the associated vectors 0 to 7. The area covered by each of the circles 51 to 65 represents the approximate detection area for each of the vectors 0 to 7, but more importantly, the circles 51 to 65 establish the distance separating adjacent pairs of the signal vectors.

Transmission lines, such as the telephone line 17, and most communication channels in general, are limited as to the average power which can be transmitted on the line. It follows that an ideal signaling scheme is one which provides the lowest average signal power for a given separation distance. The length or magnitude of the vectors 0 to 7 is associated with the amount of power needed to transmit the components associated with that vector. Therefore, it is desirable to minimize the length of the vectors while maximizing the separation distances, i.e., the radii of the circles 51 to 65. It can now be seen that a signaling scheme wherein the circles 51 to 65 are tangential to each of the adjacent circles 51 to 65 provides the desirable features of minimum vector length (associated with minimum signal power), and maximum separation distance (associated with maximum circle radius).

With reference to FIG. 4, it will be noted that the signaling scheme of the present invention optimizes these desirable features by providing the vectors 0 to 7 with an orientation whereby the circles 51 to 65 form rows which are designated by the reference numerals 67, 69 and 71. The row 67 includes three of the circles, specifically those designated by the numerals 65, 51, and 53; the second row 69 includes the circles 63 and 55; and the third row 71 includes the circles 61, 59 and 57. Each of the circles 51 to 65 is tangential to those circles which are adjacent to it. For example, the circle 63 is tangential to the circles 65, 51, 55, 59, and 61. Similarly, the circle 55 is tangential to the circles 53, 51, 63, 59 and 57. In addition, the circles 51 and 59 are tangential to four of the other circles and the circles 53, 57, 61 and 65 are tangential to two of the other circles. As noted, this tangential orientation of the circles 51 to 65 is desirable since it provides the vectors with a minimum length, and a maximum separation distance.

With the vector and signal orientation illustrated in FIG. 4, the circles 51 through 65 of unity radius will be associated with vectors of a determinable length. For example, the vectors 0 and 4 associated with the circles 51 and 59 respectively will have a length of 1.732. The vectors 2 and 6 associated with the circles 55 and 63 will have a length of 1.000. The longest vectors 1, 3, 5 and 7 associated with the circles 53, 57, 61 and 65 respectively, will have lengths of 2.646. Since the transmission power is associated with the square of the vector magnitude, it can be shown that the power for the vectors 0 and 4, 2 and 6, and 1, 3, 5, and 7 are 1, 3, and 7, respectively, and that the average signal power is equal to the average of the vector lengths squared. Thus the average signal power for the scheme of the present invention is equal to 4.5. Since the peak signal vector has a length of 2.646, it follows that the peak-to-rms ratio of the vector lengths is equal to 2.646 divided by the square root of 4.5, or 1.25.

Figure 5:
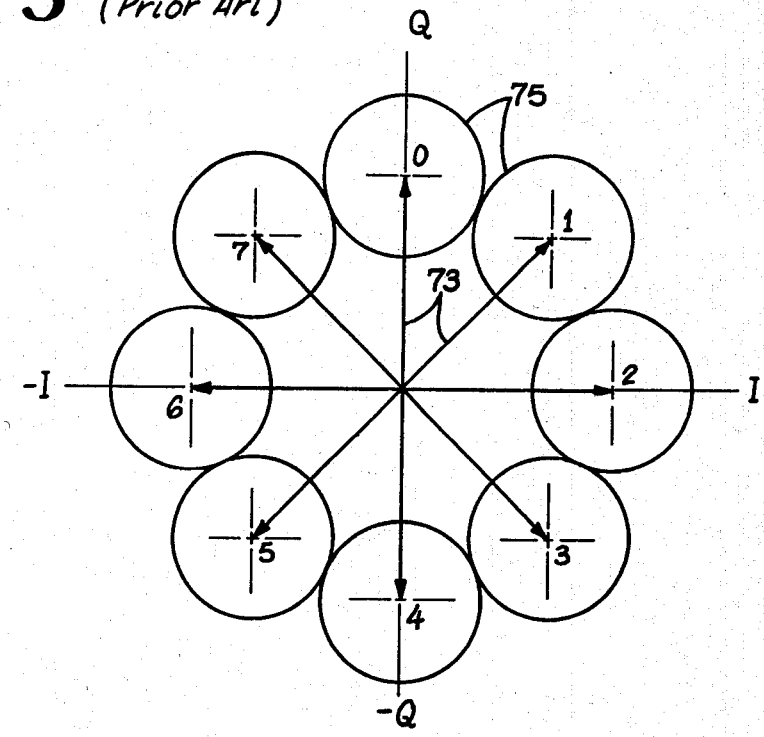
FIG. 5 is a graph illustrating signal vectors associated with a signaling scheme of the prior art.

The features and advantages will be more apparent with a brief discussion of the signaling schemes of the prior art, such as the eight vector scheme illustrated in FIG. 5. In this scheme, each of the vectors designated by reference numeral 73 is associated with one of a plurality of circles 75. The vectors 73 all have the same length which provides a desirable peak-to-rms ratio of unity. However, in order for circles 75 to have a unity radius, the vectors 73 must have a length of 2.613. The average signal power associated with vectors of this length is equal to $(2.613)^2$, or 6.828. Thus the performance of the signaling scheme of the present invention, which has an average signal power of 4.5, is better than the scheme illustrated in FIG. 5 by 1.81 db.

A further scheme of the prior art is illustrated in FIG. 7. In this scheme, four vectors, each designated by the reference numeral 77, are aligned on the abscissa and ordinate of the associated graph. Four vectors, each designated by the reference numeral 79, are disposed at a 45° angle to the vectors 77. Each of the vectors 77 and 79 is associated with one of a plurality of circles 81 having a radius of unity.

In this scheme, the vectors 79 have a length of 1.414 and the circles 81 associated with the vectors 79 have a tangential relationship. However, the vectors 77 have a length of 3.000 so that the circles 81 associated with the vectors 77 are not tangential to any of the other circles 81.

Figure 6:
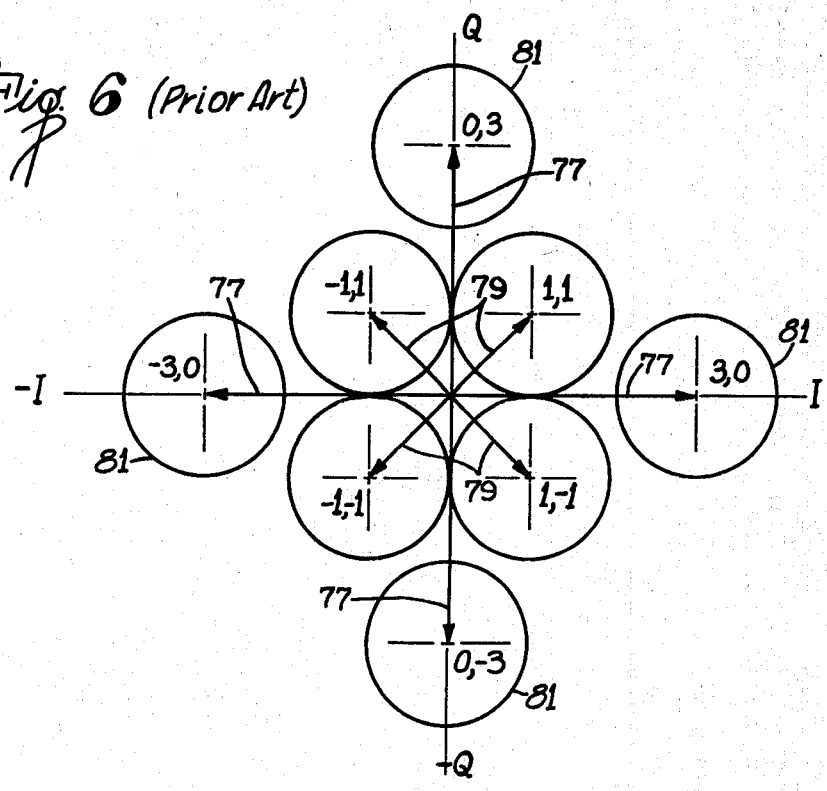
FIG. 6 is a graph illustrating signal vectors associated with another signaling scheme of the prior art.

For such a signaling scheme, it can be shown that the average signal power is equal to 5.5. Compared to the average signal power (4.5) of the signaling scheme of the present invention, the performance of the scheme illustrated in FIG. 6 is degraded by 0.87 db. Furthermore, the significant variation between the peak signal vector having a magnitude of 3.000 and the minimum signal vector having a magnitude of 1.414, provides a peak-to-rms ratio of 1.28 which is greater than that associated with the scheme of the present invention.

Having established the desirability of the vector orientation of the present invention, the function of the Gray code converter 45 and the Modulo +8 counter 47 can be more easily understood. It will be noted that in the table illustrated in FIG. 3A, the randomized data signal $c_i$ and the Gray coded signal $b_i$ each include three bits per symbol. Each of these three bit symbols $c_i$ and $b_i$ is illustrated in FIG. 4 adjacent to the associated vector 0 to 7. The purpose of the Gray code converter 45 is to minimize adjacent symbol errors. This can be accomplished by minimizing the number of bit changes in the symbols associated with the adjacent vectors 0 to 7.

By minimizing the bit changes in the symbols associated with the adjacent vectors, it is possible to minimize the error associated with the detection of a vector outside of its associated vector area. In other words, by defining the adjacent vector areas with symbols which are similar, the errors associated with incorrect detection of the vectors 0 to 7 can be minimized. For example, it will be noted that there is only a single bit change in the symbol $b_i$ associated with a particular vector and the symbol $b_i$ associated with the vectors adjacent to the particular vector in the order of vectors from 0 to 7.

More specifically, it will be noted that the symbol $b_i$ associated with the vector 3 is 010 and the $b_i$ symbol associated with the vector 4 is 110. Thus the $b_i$ symbols associated with the vectors 3 and 4 differ only with a change in the most significant bit of the respective $b_i$ symbols. For comparison, it will be noted that the $c_i$ symbols for these vectors 3 and 4 are 011 and 100, respectively. Thus, the symbols in the $c_i$ signals associated with these vectors have a three bit change while the symbols $b_i$ associated with the Gray encoded signal have only a single bit change. As a practical matter, this means that if data associated with the vector 3 is detected as the vector 4, this will result in only a single bit error rather than a three bit error.

When the data on the telephone line 17 is received by the receiver 21, the vector component $DI_j$ may either appear on the +I axis, shown in FIG. 4, or it may appear out of phase at some random angle such as 90°, 180°, or 270°. Thus, the vector component $DI_j$ may appear as +Q, −I or −Q. With the vector orientation of the present signaling scheme, the receiver 21 will know that the $DI_j$ signal is incorrectly orientated if it appears on the Q axis. With such an orientation, the circles 51 to 65 would not appear in the rows 67, 69 and 71; they would appear as columns. However, if the $DI_j$ signal is received as −I, the circles 51 to 65 would appear in the rows 67, 69 and 71. Thus, it is said that this particular signaling scheme has a 180° ambiguity. It is of particular advantage to the present invention that there are no 90° ambiguities to be resolved in the present signaling scheme. As a comparison, it will be noted that the prior art signaling scheme illustrated in FIG. 6 must resolve not only a 180° ambiguity, but also a 90° ambiguity. The prior art signaling scheme illustrated in FIG. 5 has ambiguities at 180°, 90° and even 45° which must be resolved.

It is the purpose of the Modulo +8 counter 47 to resolve the 180° ambiguity so that the $DI_j$ signal received as either +I or −I, for example, will convey the same data. Thus it is the purpose of the Modulo +8 converter 47 to differentially encode the data so that the same information is conveyed whether the $DI_j$ signal appears as either +I or −I. In this particular embodiment of the invention, the signal $d_i$ at the output of the Modulo +8 counter 47 is given by the following equation:

$$d_i = c_i \text{ MOD}_{+8} d_{i-1} \quad \text{(Equation 1)}$$

In the particular transmitter 13 illustrated in FIG. 1, digital filtering and modulation techniques, although not generally required, can be utilized. When these techniques are utilized, then a proper relationship must exist between the data rate at which the randomizer 43 functions; the baud rate at which the converter 45, the counter 47 and the generator 49 function; and the sampling rate at which the lowpass filters 31 and 33, and the digital-to-analog converter 39 function. For example, in the embodiment described above, the data rate may be 4800 bits per second. Using the signaling scheme of the present invention, whereby each of the eight vectors includes three bits per baud, the baud rate is 4800 divided by 3 or 1600. This baud rate is equivalent to the number of symbols per second. The sampling rate should be equal to or greater than twice the highest frequency generated in the filtering and modulation process. If the ROM 35 provides a carrier frequency of 1600 Hertz, then a modulated baud rate frequency of 1600 Hertz will include frequencies of interest as high as 3200 Hertz. In that event, the sampling frequency should be at least two times 3200 or 6400 Hertz.

A functional block diagram of an automatic equalized modem for receiving the signaling scheme previously described is illustrated in FIG. 7. The incoming signal from the telephone line 17 can be introduced to a bandpass filter and automatic gain control 81 where it is bandpass filtered to remove extraneous signals and noise, and gain adjusted to provide an approximately correct signal level. This signal is then converted into an equivalent digital word by an analog-to-digital converter and sampler 83 which operates at the sampling frequency. It is usually convenient to use the same sampling frequency in both the transmitter 13 and the receiver 21.

The digitized received signal is then multiplied by sample values of the sine and cosine of the reference frequency. In a preferred embodiment, this reference frequency is the same as the transmitted carrier frequency of 1600 Hertz although this similarity is not essential to operation of the system.

The digitized received signal can then be introduced to a pair of multipliers 85 and 87 where it is multiplied by values of the cosine and sine respectively of a reference carrier. These values are provided by an oscillator 89. In a preferred embodiment, the reference carrier has the same frequency, 1600 Hertz, as the transmitted carrier frequency although this similarity is not essential to the operation of the modem.

The products of the received signal and the sine/cosine values can then be applied to digitally implemented lowpass filters 91 and 93 where the higher frequency products are eliminated. These lowpass filters 91 and 93 can be nonrecursive or recursive filters, typical of the prior art. In the preferred embodiment, the filters 91 and 93 are nonrecursive filters of the transversal type having tap coefficients approximating the desired filter impulse response. Both the sampler 83 and the filters 91 and 93 operate at the sampling frequency. Following demodulation, however, additional processing of the signals will typically occur at the baud rate, such as 1600 Hertz. At the output of the lowpass filters 91 and 93, the samples in both the I and Q channels can be introduced to an equalization network 95 of the type disclosed and claimed in our copending application for an AUTOMATIC DIGITAL MODEM, Ser. No. 324,657, filed Jan. 18, 1973, and assigned of record to the assignee of record of the present application. This equalization network 93 has characteristics for substantially eliminating both the in-phase and quadrature distortion resulting from transmission over the telephone line 17.

The equalized data signals can then be introduced to a phase correction network 97 also of the type disclosed in the copending application Ser. No. 324,657. This phase correction network 97 essentially functions as a second demodulator whose frequency and phase is the difference between the received carrier frequency and the reference frequency of the oscillator 89. It is the function of this phase correction network 97 to remove any frequency or phase error in the received data signal prior to detection.

The detection process for the signaling scheme in the present invention can be more easily understood with reference to FIG. 4. In this Figure, the expected signal values are shown with the I axis representing the in-phase signal components and the Q axis representing the quadrature signal components. In addition to the vectors 0 through 7 and the associated circles 51 to 65, FIG. 4 also illustrates a plurality of boundary lines which extend tangentially to the circles 51 to 65 at their points of tangency. Thus, the boundary lines separate the individual circles 51 to 65 and define boundary areas each associated with one of the vectors 0 to 7. For example, the boundary lines include those designated by the reference numerals 99, 101, 103, and 105. These lines 99 to 105 define a boundary area that is associated with the vector 0. It will be noted that the boundary lines 99 and 105 have a substantially parallel relationship with the Q axis while the boundary lines 101 and 103 have an angular relationship to both the Q axis and the I axis. To further distinguish the boundary areas associated with the schemes of the prior art, it will be noted that the boundary lines 103 and 105 intersect at a point shown generally at 107. This point 107 is displaced from both the I axis and the Q axis.

A boundary area associated with the vector 2 is defined by the boundary line 103, and a plurality of boundary lines illustrated by the reference numerals 109, 111, 113 and 115. This boundary area has the configuration of a pentagon. Additionally, it will be noted that an extension of each of the boundary lines passes through a point defined by the components of one of the vectors 0 to 7. For example, extensions of the boundary lines 115 and 103 pass through points disposed at the tips of the vectors 0 and 1 respectively.

It is to be expected that due to the deficiencies of the transmission line, such as the telephone line 17, the vector components $DI_j$ and $DQ_j$ may be somewhat distorted. In this event, these components will not define vectors having the exact values shown for the vectors 0 through 7. However, any vector detected within the associated boundary area will be assumed to have the vector components of the associated vector 0 to 7. For example, any vector defined within the area bounded by the lines 99, 101, 103 and 105 will be assumed to have a vector component $DI_j$ equal to zero and a vector component $DQ_j$ equal to 1.732.

This detection within boundary areas can be accomplished in a detection network 117 which generates three straight line equations which approximate the ideal detection boundaries. For example, the following equations can be generated in the detection network 117.

$$I = 1 \qquad \text{(Equation 2)}$$

$$Q = 0.577 I + 0.557 \qquad \text{(Equation 3)}$$

$$Q = -0.577 I + 1.732 \qquad \text{(Equation 4)}$$

It will be noted hat Equation 2 substantially defines the boundary line 105, Equation 3 substantially defines the boundary line 103, and Equation 4 substantially defines the boundary line 115. It can be shown that by merely changing the signs in the Equations 2, 3 and 4, an equation can be generated for each of the boundary lines associated with the vectors 0 to 7.

Using these equations, any vector appearing in a particular boundary area will be assumed to have the vector components of the vectors 0 to 7 associated with that area. For example, if the signs of the I and Q signals are positive, the signal in the I channel is less than unity (i.e. Equation 2 is negative), and the combined I and Q signals as implemented by Equation 3 are positive, then the received signal will be detected as the vector or signal state 0. Thus the $DI_j$ component will be assumed to be zero and the $DQ_j$ component will be assumed to be 1.732. If the I channel signal is greater than the unity and the combined I and Q signal as implemented by Equation 4 is positive, then the received signal will be detected as the vector or signal state 1. In this event, the $DI_j$ component is assumed to be 2.000 while the $DQ_j$ component is assumed to be 1.732. As a further example, if both the combined I and Q signals as implemented by equations 3 and 4 are negative, then the received signal will be detected as vector or signal state 2. The signal components $DI_j$ equals 1 and $DQ_j$ equals 0 are associated with this signal state. The remaining signal states are detected similarly but with different signs of the I and Q signals.

One possible implementation of the detection network 117 is illustrated in FIG. 8 wherein the equalized and phase corrected signals in the I and Q channels, YI and YQ respectively, provide the inputs to the network 117. The detection network 117 provides at its output the following detection signals:

$$A = \text{SGN}(YI)$$

$$B = \text{SGN}(YQ)$$

$$C = \text{SGN}(|YI| - l_o)$$

$$D = \text{SGN}(|YQ| + 0.557|YI| - 1.732 l_o)$$

$$E = \text{SGN}(|YQ| - 0.557|YI| - 0.577 l_o)$$

where:
  SGN ($X$) is the sign of $X$ and is either positive or negative;
  $|X|$ is the magnitude of $X$; and
  $l_o$ is the signal reference level which is typically normalized to unity.

In a preferred embodiment of the invention, the signals YI and YQ are introduced to the detection network 117 along with multiplying quantities 0.5, 0.577, 0.289, and 0.866. In addition, a reference signal level equal to $2l_o$ is introduced to the detector 117 from a decision threshold control 119 discussed in greater detail below. The YI and YQ signals are introduced to a pair of comparators 121 and 123 and a pair of magnitude extractors 125 and 127 respectively. At the output of the comparator 121, a signal equal to SGN (YI) is provided on a conductor 129. This signal is equivalent with that associated with detection signal A. Similarly, the output of the comparator 123 produces a signal equal to SGN (YQ) on a conductor 131 which is equivalent to the detection signal B.

The output of the magnitude extractor 125 is introduced to the positive terminal of a comparator 133. A signal $l_o$, which can be introduced to the negative terminal of the comparator 133, can be derived by multiplying the signal $2l_o$ by the multiplying quantity 0.5 in a multiplier 135. The output of the comparator 133 provides a signal equal to SGN ($|YI| - l_o$) on a conductor 137. This signal is the same as that associated with the detection signal C.

The output of the magnitude extractor 125 can also be introduced to a multiplier 139 along with the multiplying quantity 0.577. The resulting product, $0.577|YI|$, can be introduced to a positive terminal of an adder 141 along with a signal from the output of the magnitude extractor 127. The resulting summation can be introduced to the positive terminal of a comparator 143. A signal equal to $1.73 l_o$, which can be introduced to the negative terminal of the comparator 143, can be derived by multiplying the signal $2l_o$ by the multiplying quantity 0.866 in a multiplier 145. The signal at the output of the comparator 143, which is introduced on a conductor 146, can be that associated with the detection signal D set forth above.

The signal from the magnitude extractor 127 can also be introduced to the positive terminal of the differential adder 147. The negative terminal of the adder 147 can be connected to receive the product $0.577|YI|$ from the multiplier 139. The output of this differential adder 147 can then be introduced to the positive terminal of a comparator 149. The quantity $0.577 l_o$ can be generated by multiplying the signal $2l_o$ by the factor 0.289 in a multiplier 151. The resulting product from the multiplier 151 can be introduced to the negative terminal of the comparator 149. The resulting signal at the output of the comparator 149, which appears on the conductor 153, has the characteristics previously set forth for the detection signal E.

The signals on the conductors 129, 131, 137, 145 and 153 can be used to address a ROM 155 which is programmed to provide the data signal $d_i$. The programming of the ROM 155 can be in accordance with the table set forth in FIG. 8A wherein the signals A to E are represented by a numeral 1 associated with a positive sign and a numeral 0 associated with a negative sign. The letter X represents a DON'T CARE STATE which can be either 1 or 0. With the detection signal combinations tabulated, the incoming signal can be detected as one of the eight signal vectors 0 to 7 and the associated data $d_i$ provided on a plurality of conductors 156 at the output of the ROM 155.

On a plurality of conductors 158, 160 and 162 the ROM also provides the respective quantities DI/2, DQ/2, and the quantity K which is equal to $1/(|DI| + |DQ|)$. These quantities can be used in error detection in a manner set forth below.

Referring again to FIG. 7, it will be noted that the signal $d_i$ provided at the output of the detection network 117 can be introduced to a Modulo −8 counter 157 which functions in a manner the reverse of that of the Modulo +8 counter 47 illustrated in FIG. 3. Thus, the Modulo −8 counter 157 differentially decodes the signal $d_i$ in accordance with the following equation:

$$c_i = d_i \,(\text{MOD}_{-8})\, d_{i-1} \qquad \text{(Equation 5)}$$

The signal $c_i$ at the output of the counter 157 can be introduced to a Gray decode converter 159 which functions in a manner which is substantially the reverse of that of the Gray code converter 45 illustrated in FIG. 3. In other words, the converter 159 is responsive to the signal $c_i$ to provide the signal $b_i$. This signal $b_i$ can then be introduced to a derandomizer 161 which provides the data signal $a_i$. This data signal $a_i$ can then be forwarded to the data processing apparatus 23. Thus, with respect to the overall system, it is now apparent that the data signal $a_i$ initially provided by the data processing apparatus 11 can be transmitted to the data processing apparatus 23 using an optimal eight vector signaling scheme.

The remaining portions of the receiver 21 function in a manner similar to that disclosed and claimed in the patent application Ser. No. 324,657. Thus, the YI and YQ signals from the phase correction network 97 can be introduced to an error calculator 163 which provides a pair of system error signals EI and EQ. These error signals can be used for updating the sampler 83, equalization network 95, and the reference level $l_o$ of the detection network 117. For example, the system error signal can be introduced to a timing control network 165 for updating the sampler 83, and can be introduced to an equalization control network 167 for updating the equalization network 95. Signals from the equalization control network 167 can be used by the decision threshold control 119 to derive the signal $2l_o$. In a preferred embodiment, the error signals EI and EQ are given by the following equations:

$$EI = YI - DI l_o \qquad \text{(Equation 6)}$$

$$EQ = YQ - DQl_o \qquad \text{(Equation 7)}$$

The error calculator 163 also provides a phase error signal $E_{PLL}$ which is introduced to a filter 169 for updating the operation of the phase correction network 97. This phase error signal $E_{PLL}$ is given by the following equation in a preferred embodiment of the invention:

$$E_{PLL} = \frac{SGN\ YI - SGN\ YQ}{|DI| + |DQ|} \qquad \text{(Equation 8)}$$

Referring again to FIG. 7, it will be noted that the error calculator 163 can be connected to receive the signals YI and YQ from the phase correction network 97 and the signal $2l_o$ from the decision threshold control 119. In addition, the error calculator 163 can be connected to receive the signals on the conductors 129, 131, 158, 160 and 162 from the ROM 155. In FIG. 7, these conductors are designated collectively with the reference numeral 171.

The erro calculator 163 is shown in greater detail in FIG. 9. The signal $2l_o$ from the decision threshold control 119 is introduced to a pair of multipliers 173 and 175 which are additionally connected to receive the signals DI/2 and DQ/2 on the respective conductors 158 and 160. The product from the multiplier 173 is introduced to the negative terminal of an adder 177 while the product from the multiplier 175 is introduced to the negative terminal of an adder 179. The positive input terminal of the adder 177 is connected to receive the signal YI from the phase correction network 97. The resulting signal at the output of the adder 177 is equal to $(YI - DIl_o)$ which will be recognized as the system error term EI set forth in Equation 6. This error term EI can be provided at the output of the error calculator 163 on a conductor 181.

In a similar manner, the positive input terminal of the adder 179 can be connected to receive the YQ signal from the phase correction network 97. The resulting signal at the output of the adder 179 is equal to $(YQ - DQl_o)$ which can be recognized as the desired error signal EQ set forth in Equation 7. In a preferred embodiment, this error signal EQ is provided at the output of the error calculator 163 on a conductor 183.

In order to produce the phase error signal $E_{PLL}$, the error signal EI can be introduced to a multiplier 185 and the error signal EQ can be introduced to a multiplier 187. The conductor 131 can introduce the SGN YQ signal to the multiplier 185. The product from the multiplier 185, EI SGN YQ, can be introduced to the positive input terminal of an adder 189. In a similar manner, the conductor 129 can introduce the SGN YI signal to the multiplier 187. The resulting product at the output of the multiplier 187, EQ SGN YI, can be introduced to the negative input terminal of the adder 189. The signal at the output of the adder 189, (EI SGN YQ − EQ SGN YI), can be introduced to a multiplier 191 along with the signal K from the detection network 117. The resulting equation at the output of the multiplier 191 can be recognized as the desired phase error signal set forth in Equation 8.

The system error signals EI and EQ and the error signal for the phase lock loop, $E_{PLL}$, are the same as those disclosed and claimed in the patent application Ser. No. 324,657. It follows that the control networks 165, 167 and 119 which are responsive to the system error signals EI and EQ can function in the manner disclosed and claimed in the patent application Ser. No. 324,657. The filter 169 which is responsive to the error signal $E_{PLL}$ to update the corrections of the phase correction network 97, can also function in the manner disclosed and claimed in the patent application Ser. No. 324,657.

In accordance with the foregoing discussion, an automatic digital modem can be provided with an eight vector signaling scheme which, in comparison to the signaling schemes of the prior art, greatly enhances the performance of the modem. More specifically, the scheme of the present invention provides an improvement in performance which can result in a reduction of almost ten to one in symbol error over the best scheme of the prior art. Furthermore, this is accomplished with a reduction in the peak-to-rms ratio of the transmission power. The scheme of the present invention provides signaling vectors of comparable length. Furthermore, the magnitude of the vectors is minimized, commensurate with a maximized separation distance, so that the average signal power is reduced without significantly affecting detection capabilities.

With the implementation of this highly advantageous signaling scheme, error signals can be derived to facilitate the updating of sampling, equalizing, and phase correcting functions in the receiver 21.

Although the invention has been disclosed with reference to specific embodiments for implementing the signaling scheme, it will be apparent to those skilled in the art that the scheme can be otherwise implemented and embodied. For example, it would be obvious to provide a signaling scheme wherein the circles 51 to 65 were oriented in columns substantially parallel to the Q axis in FIG. 4 rather than the rows 65 to 71 which are illustrated to be substantially parallel to the I axis in FIG. 4. Also, it is obvious that in a particular embodiment, the Modulo +8 counter 47 and the Modulo −8 counter 157 can be eliminated. Furthermore, the Gray code converter 45 and the Gray decode converter 159 may also be eliminated in a particular embodiment. For this reason, the scope of the invention should be ascertained only with reference to the following claims.

We claim:

1. An eight-vector signaling system for transmitting information representative of a first series of digital data symbols, said system including:

signal generation means responsive to each of the digital data symbols in the series for providing a first digital signal having in-phase components and quadrature components, each of the in-phase components defining with an associated one of the quadrature components one of eight vectors, said eight vectors including a first group of four vectors each having a first magnitude, a second group of two vectors each having a second magnitude less than the first magnitude, and a third group of two vectors each having a third magnitude less than the second magnitude;

transmission means responsive to the first digital signal for transmitting the information in the first digital signal;

receiver means responsive to the information transmitted by the transmission means for producing a second digital signal having in-phase components and quadrature components related to the in-phase components and quadrature components of the first digital signal; and detection means for detecting the information in the second signal and for providing a second series of digital data symbols related to the first series of digital data symbols.

2. The system recited in claim 1 wherein the signal generation means provides each of the in-phase components of the vectors in the first group of vectors with a magnitude equal to twice the magnitude of one of the vectors in the third group of vectors, and each of the quadrature components of the vectors in the first group of vectors with a magnitude equal to the magnitude of one of the vectors in the second group of vectors.

3. The system set forth in claim 1 wherein the signal generation means provides the vectors in the second group of vectors with in-phase components of substantially zero magnitude and the vectors in the third group of vectors with quadrature components of substantially zero magnitude.

4. A transmission system responsive to a first digital signal for transmitting information on a transmission line comprising:
first signal conversion means responsive to the first signal for providing a second digital signal having in-phase components and quadrature components, each of the in-phase components defining with an associated one of the quadrature components one of eight vectors, each of said eight vectors having a magnitude and a minimum separation distance, said minimum separation distances for said vectors being approximately equal, and the average of the vector magnitudes squared being not greater than about four and one-half times the minimum separation distance;
means for processing the second digital signal to provide a third signal and for introducing the third signal to the transmission line;
means responsive to the information from the transmission line for processing the information to produce a fourth digital signal having in-phase components and quadrature components which define a plurality of vectors with characteristics dependent upon the information received from the transmission line; and
second signal conversion means responsive to the fourth signal for providing a fifth digital signal having characteristics related to the first digital signal.

5. A system for transmitting information over a communication channel wherein the information is represented by a first series of digital data symbols, said system comprising:
signal generation means responsive to each of the digital data symbols in the series for providing a first digital signal having in-phase components and quadrature components, each of the in-phase components defining with an associated one of the quadrature components one of at least eight vectors all having a common origin;
means for processing said first digital data signal to provide a second signal and for introducing the second signal to the communication channel;
means responsive to the information transmitted through the communication channel for producing a third digital signal having in-phase components and quadrature components related to the in-phase components and quadrature components of the first signal;
detection means for detecting all signals in eight detection zones as said eight vectors, respectively, said eight vectors lying within said eight detection zones, respectively, adjacent detection zones having common boundaries;
first, second and third of said common boundaries being nonperpendicular to each other and intersecting, said first common boundary being substantially parallel to at least one of said vectors and the second and third common boundaries being nonparallel to said vectors.

6. The system recited in claim 5 wherein the second common boundary intersects a fourth common boundary at a point displaced from the origin.

7. The system recited in claim 5 wherein five of said common boundaries intersect to define one of said detection zones, said one detection zone having the configuration of a pentagon.

8. A system for transmitting information wherein the information is represented by a series of digital data symbols, comprising:
signal generation means responsive to each of the digital data symbols in the series for providing in an in-phase channel an in-phase signal component and for providing in a quadrature channel a quadrature signal component, the in-phase signal component defining with the quadrature signal component one of eight vectors including a first group of four vectors each having a first magnitude, a second group of two vectors each having a second magnitude less than the first magnitude, and a third group of two vectors each having a third magnitude less than the second magnitude; and
means responsive to the digital signal components for providing a second signal in analog format for transmission to another location.

9. The modem recited in claim 8 wherein the magnitudes of the plurality of vectors are such that the ratio of the third magnitude to the root-means-square of all of the magnitudes of the vectors does not exceed 1.24 when the minimum distance separating the vectors is equal to unity.

10. A system for transmitting information, comprising:
first means responsive to the information for providing a first digital signal;
signal generation means responsive to the first digital signal for providing digital signal components in an in-phase channel and a quadrature channel;
each of the signal components in the in-phase channel having an associated signal component in the quadrature channel whereby each of the signal components in the in-phase channel and the associated signal component in the quadrature channel define an associated pair of signal components;
each of said pair of signal components defining one of a plurality of vectors, said plurality of vectors including first, second, third and fourth vectors, the first and second vectors being spaced approximately 180° from each other and approximately 90° from the third and fourth vectors and being approximately $\sqrt{3}$ times the absolute value of the magnitude of said third and fourth vectors, respectively, said third and fourth vectors being spaced approximately 180° from each other and being of approximately equal length, said first and second vectors being of approximately equal length; and
means responsive to the digital signal components for providing a second signal in analog format for transmission to another location.

11. A system as defined in claim 10 wherein there are eight of said vectors, the minimum separation between the eight vectors being approximately equal to the length of the first vector.

12. A system as defined in claim 10 wherein said first means includes second means responsive to the information to provide a second digital signal and third means including a Gray code converter responsive to the second digital signal for providing said first digital signal.

13. A system as defined in claim 10 wherein said first means includes second means responsive to the information to provide a second digital signal and third means including a modulo counter responsive to the second digital signal for providing said first digital signal.

14. A system as defined in claim 10 wherein said first means includes second means responsive to the information to provide a second digital signal, a Gray code converter responsive to the second digital for providing a third digital signal, and a modulo counter responsive to the third digital signal for providing said first digital signal.

15. A system as defined in claim 10 wherein each of said first and second vectors has a first length and said first and second vectors are the only vectors of said plurality of vectors which are of said first length, each of said third and fourth vectors has a second length and said third and fourth vectors are the only vectors of said plurality of vectors which are of said second length.

16. A system for transmitting information, comprising:
first means responsive to the information for providing a first digital signal;
signal generation means responsive to the first digital signal for providing digital signal components in an in-phase channel and a quadrature channel;
each of the signal components in the in-phase channel having an associated signal component in the quadrature channel whereby each of the signal components in the in-phase channel and the associated signal component in the quadrature channel define an associated pair of signal components;
each of said pair of signal components defining one of a plurality of vectors, said plurality of vectors including first, second, third and fourth vectors, the first and second vectors being spaced approximately 180° from each other and approximately 90° from the third and fourth vectors and being of approximately $\sqrt{3}$ times the absolute value of the magnitude of said third and fourth vectors, respectively, said third and fourth vectors being spaced approximately 180° from each other and being of approximately equal length, said first and second vectors being of approximately equal length; and
detection means for detecting all signals in first, second, third, and fourth detection zones as said first, second, third, and fourth vectors, respectively, said first, second, third, and fourth vectors lying within said first, second, third, and fourth detection zones, respectively, said first and third detection zones being adjacent and having a first common boundary tangent to the point of tangency of first and second tangent circles of equal radii having their centers at the tips of the first and third vectors, respectively.

17. A system as defined in claim 16 wherein said vectors intersect at an origin and said first common boundary does not intersect said origin.

18. A system as defined in claim 16 wherein said plurality of vectors includes a fifth vector which has a greater magnitude than, and which lies intermediate, the first and third vectors, said detection means includes means for detecting all signals in a fifth detection zone as said fifth vector, said fifth vector lying in said fifth detection zone, said first and fifth detection zones having a second common boundary and said third and fifth detection zones having a third common boundary, said second common boundary being tangent to the point of tangency of said first circle and a third circle having its center at the tip of said fifth vector, said second common boundary being generally parallel to said first vector.

19. A system as defined in claim 18 wherein said third common boundary is tangent to the point of tangency of said second and third circles and is nonparallel to said first and third vectors.

20. A system as defined in claim 19 wherein the radius of each of said circles is one, said first vector lies along a first axis and said third vector lies along a second axis and said first, second, and third common boundaries are defined respectively by the following equations:

$$b = 0.577a + 0.577$$
$$a = 1$$
$$b = -0.577a + 1.732$$

where
$a$ is the distance from the first axis, and
$b$ is the distance from the second axis.

21. A system as defined in claim 16 wherein said third detection zone has a second boundary which is tangent to said second circle and which intersects said first common boundary.

22. A receiver for receiving a transmitted signal having an analog format representative of information, said receiver comprising:
means for converting the signal received from the transmitter to a digital signal having digital signal components in an in-phase channel and a quadrature channel;
each of the signal components in the in-phase channel having an associated signal component in the quadrature channel whereby each of the signal components in the in-phase channel and the associated signal component in the quadrature channel define an associated pair of signal components;
each of said pair of signal components defining one of a plurality of vectors;
detection means responsive to the signal components for detecting all vectors in first, second, and third detection zones as first, second and third vectors, respectively, said first detection zone having a first common boundary with said second detection zone and a second common boundary with said third detection zone and said second and third detection zones having a third common boundary;
said detecting means including first means responsive to the signal components for providing first and second detection signals which are dependent upon the sign of the digital signal components in the in-phase and quadrature channels, respectively;

said detecting means including second means responsive to the signal components for providing third, fourth, and fifth detection signals dependent upon the equations which define the first, second, and third common boundaries, respectively; and said detection means including a read only memory responsive to said detection signals for providing a second digital signal which is representative of the information transmitted.

23. A receiver as defined in claim 22 including correcting means for correcting at least some of the distortion in the digital signal to provide a corrected signal and wherein said read only memory provides a first plurality of signals, said receiver includes error calculator means responsive to said first plurality of signals for providing an error signal, and said correcting means is responsive to said error signal.

24. A receiver as defined in claim 22 wherein the third, fourth, and fifth detection signals equal $$\text{SGN}(|YI| - I_o)$$

$$\text{SGN}(||YQ| + 0.557\ YI| - 1.732 I_o)$$

$$\text{SGN}(||YQ| - 0.557\ YI| - 0.557 I_o),$$

respectively, where

SGN $(X)$ is the sign of $X$, $|YI|$ is the magnitude of the digital signal component in the in-phase channel, $|YQ|$ is the magnitude of the digital signal component in the quadrature channel, and $I_o$ is a reference signal level.

25. A receiver for a digital data system of the type in which each of a plurality of data symbols is transmitted as a pair of in-phase and quadrature components which components define in in-phase and quadrature vector space an array of points at the centers of an array of closely packed circles of equal diameter, said receiver comprising:

means for determining the in-phase and quadrature components of received signals; and detection means for applying arithmetic conditions to the components to assign them to one of at least four detection areas containing individual ones of said points, said conditions establishing boundaries between said detection areas which include a first group of at least four straight lines tangential to the circles at their points of tangency to each other and a second straight line intersecting a first straight line of said first group of straight lines at a location spaced from the origin of said vector space, said first straight line and said second straight line being non-perpendicular to each other.

26. A receiver as defined in claim 25 wherein said boundaries include a third straight line which intersects said first and second straight lines at said location and is parallel to at least one of said vectors, said first, second and third straight lines being nonperpendicular to each other.

* * * * *